US009935515B2

United States Patent
Nakamura et al.

(10) Patent No.: US 9,935,515 B2
(45) Date of Patent: Apr. 3, 2018

(54) ARMATURE FOR ROTARY ELECTRIC MACHINE

(71) Applicant: Mitsubishi Electric Corporation, Tokyo (JP)

(72) Inventors: Masashi Nakamura, Tokyo (JP); Shogo Okamoto, Tokyo (JP); Tatsuro Hino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 545 days.

(21) Appl. No.: 14/616,813

(22) Filed: Feb. 9, 2015

(65) Prior Publication Data

US 2016/0065026 A1 Mar. 3, 2016

(30) Foreign Application Priority Data

Sep. 3, 2014 (JP) ................................. 2014-179100

(51) Int. Cl.
*H02K 3/34* (2006.01)
*H01F 41/12* (2006.01)
*H02K 3/38* (2006.01)

(52) U.S. Cl.
CPC ............. *H02K 3/38* (2013.01); *H01F 41/122* (2013.01); *H02K 3/34* (2013.01)

(58) Field of Classification Search
CPC ........ H02K 15/105; H02K 15/10; H02K 3/38; H02K 3/34; H01F 41/122; H01F 41/125
See application file for complete search history.

(56) References Cited

U.S. PATENT DOCUMENTS

| 7,713,892 B2 * | 5/2010 | Kihara .................... B32B 27/34 428/414 |
| 2009/0108696 A1 * | 4/2009 | Horiba ..................... H02K 3/38 310/215 |

(Continued)

FOREIGN PATENT DOCUMENTS

| JP | 2006-166592 A | 6/2006 |
| JP | 2006-217679 A | 8/2006 |

(Continued)

OTHER PUBLICATIONS

English Machine Translation, Ohashi, JP 2012-170248, Sep. 2012 https://www.j-platpat.inpit.go.jp/web/all/top/BTmTopEnglishPage.*

(Continued)

*Primary Examiner* — Burton Mullins
(74) *Attorney, Agent, or Firm* — Sughrue Mion, PLLC; Richard C. Turner

(57) ABSTRACT

An armature winding is configured by mounting into an armature core a plurality of distributed-winding coils that are each produced by bending and shaping a conductor wire that is coated with insulation, coil ends are configured by arranging coil end portion rows that are formed by arranging coil end portions of the coils in a single row circumferentially in n layers in a radial direction, where n is an integer that is greater than or equal to 1, and an interphase insulating material includes: a strip-shaped insulating sheet material that is inserted inside the coil end portions, and that is disposed so as to extend circumferentially between the coil end portion rows; and an insulating buffering material that is formed on one surface of the insulating sheet material, and that is fixed to the coil end portion rows by forming air bubble groups internally.

4 Claims, 12 Drawing Sheets

(56) References Cited

U.S. PATENT DOCUMENTS

| | | | | |
|---|---|---|---|---|
| 2010/0244615 A1* | 9/2010 | Kouda | ................... | H02K 3/34 |
| | | | | 310/215 |
| 2013/0307368 A1* | 11/2013 | Suwazono | ............... | H02K 3/34 |
| | | | | 310/215 |
| 2013/0309481 A1* | 11/2013 | Kasagi | ................... | H01B 3/301 |
| | | | | 428/304.4 |

FOREIGN PATENT DOCUMENTS

| JP | 2012-80699 A | 4/2012 |
|---|---|---|
| JP | 2012-170248 A | 9/2012 |

OTHER PUBLICATIONS

English Machine Translation, Etsuno, JP 2012-80699, Apr. 2012 https://www.j-platpat.inpit.go.jp/web/all/top/BTmTopEnglishPage.*
Communication dated Jun. 30, 2015 from the Japanese Patent Office in counterpart application No. 2014-179100.

\* cited by examiner

ARMATURE FOR ROTARY ELECTRIC MACHINE

BACKGROUND OF THE INVENTION

1. Field of the Invention

The present invention relates to an armature for a rotary electric machine such as an electric motor or a generator, for example, and particularly relates to an armature winding insulating construction.

2. Description of the Related Art

In armatures for rotary electric machines, because coils to which voltages that have different phases are supplied are in close proximity to each other in coil ends, it has been necessary to insulate electrically between the coils that have different phases. Thus, it has been common to insert interphase insulating papers between the coils that have different phases in the coil ends to ensure electrical insulation between the coils that have different phases. However, because the interphase insulating papers that are disposed on the coil ends are not fixed, one problem has been that misalignment of or damage to the interphase insulating papers may arise due to vibration during operation of the rotary electric machine, reducing electrical insulation between the coils that have different phases.

In consideration of such conditions, a varnish has been impregnated and hardened in coil ends after inserting interphase insulating papers between coils that have different phases in the coil ends, to fix the interphase insulating papers to the coil ends and ensure electrical insulation between the coils that have different phases (see Patent Literature 1, for example).

CITATION LIST

Patent Literature

[Patent Literature 1] Japanese Patent Laid-Open No. 2006-217679 (Gazette)

In Patent Literature 1, one problem has been that a step of impregnating and hardening the varnish in the coil ends is required after inserting the interphase insulating papers between the coils that have different phases to ensure electrical insulation between the coils that have different phases, increasing manufacturing costs.

SUMMARY OF THE INVENTION

The present invention aims to solve the above problems and an object of the present invention is to provide an armature for a rotary electric machine that can ensure electrical insulation between coils that have different phases, and that can also reduce manufacturing costs, by enabling interphase insulating papers that are disposed in coil ends to be fixed simply without impregnating a varnish into the coil ends.

In order to achieve the above object, according to one aspect of the present invention, there is provided an armature for a rotary electric machine including: an annular armature core in which slots are arranged circumferentially; an armature winding that is mounted to the armature core; and an interphase insulating material that is disposed in a coil end of the armature winding. The armature winding is configured by mounting into the armature core a plurality of distributed-winding coils that are each produced by bending and shaping a conductor wire that is coated with insulation; and the interphase insulating material includes: a strip-shaped insulating sheet material that is inserted between radially adjacent conductor portions in portions of the conductor wires that constitute the coil end so as to have a thickness direction in a radial direction, and that is disposed so as to extend circumferentially; and an insulating buffering material that is formed on one surface of the insulating sheet material, and that fills between radially adjacent conductor portions so as to have internal air bubble groups.

Because the interphase insulating material includes: a strip-shaped insulating sheet material that is inserted between radially adjacent conductor portions in portions of the conductor wires that constitute the coil end so as to have a thickness direction in a radial direction, and that is disposed so as to extend circumferentially; and an insulating buffering material that is formed on one surface of the insulating sheet material, and that fills between radially adjacent conductor portions so as to have internal air bubble groups, it is fixed to the coil end. Thus, electrical insulation is ensured between coils that have different phases, and a step of impregnating and hardening a varnish in the coil ends is also no longer required, enabling manufacturing costs to be reduced.

DETAILED DESCRIPTION OF THE PREFERRED EMBODIMENTS

A preferred embodiment of an armature for a rotary electric machine according to the present invention will now be explained with reference to the drawings.

Embodiment 1

Figure 1:
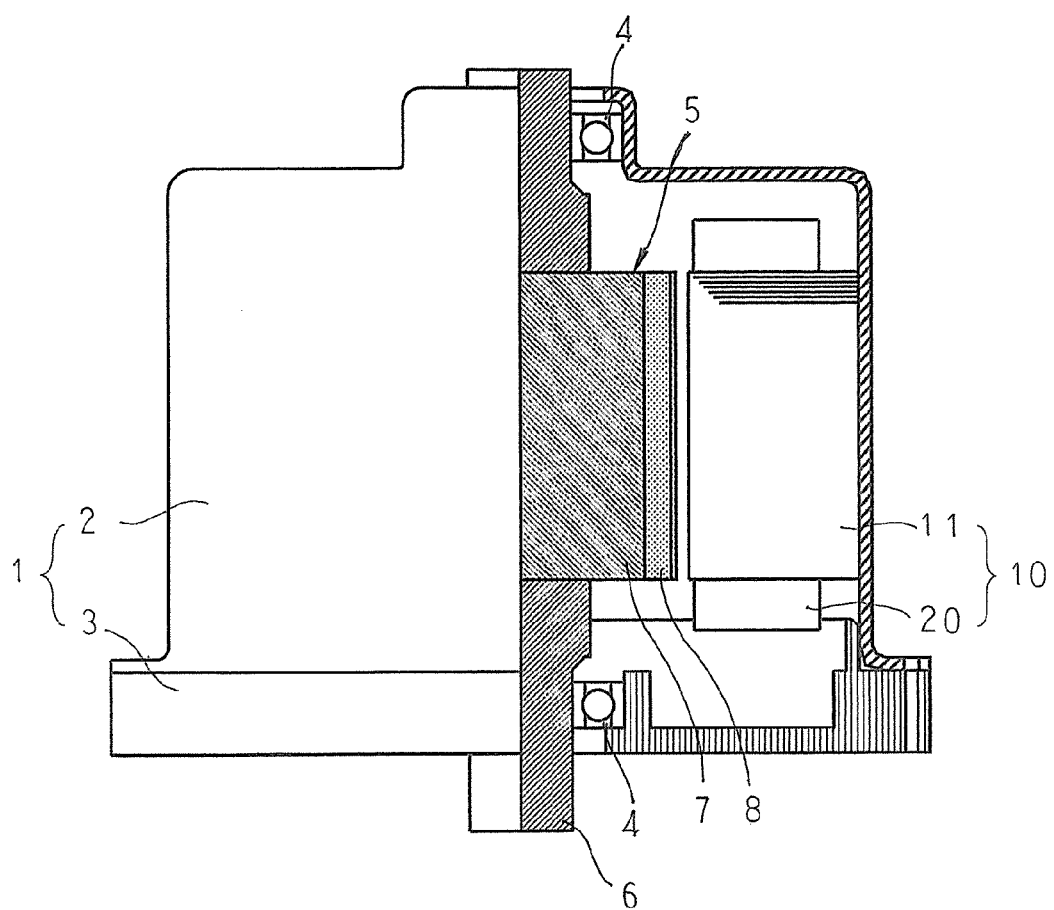
FIG. 1 is a half section that shows a rotary electric machine according to Embodiment 1 of the present invention.
Figure 2:
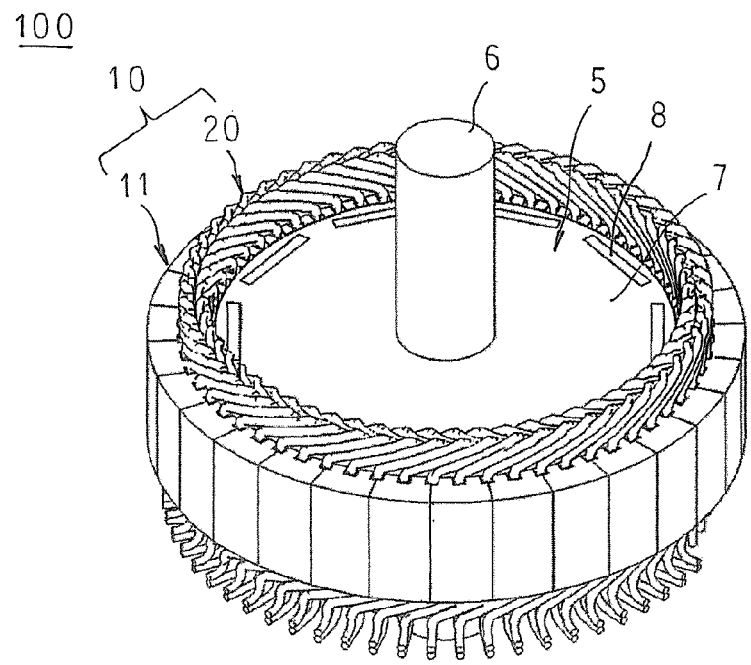
FIG. 2 is an oblique projection that shows part of the rotary electric machine according to Embodiment 1 of the present invention.
Figure 3:
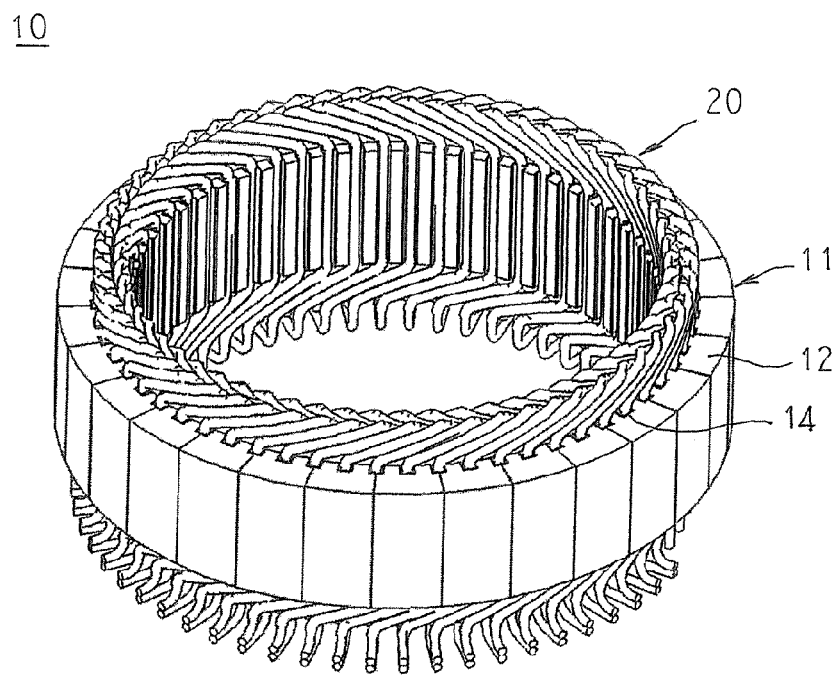
FIG. 3 is an oblique projection that shows an armature that is used in the rotary electric machine according to Embodiment 1 of the present invention.
Figure 4:
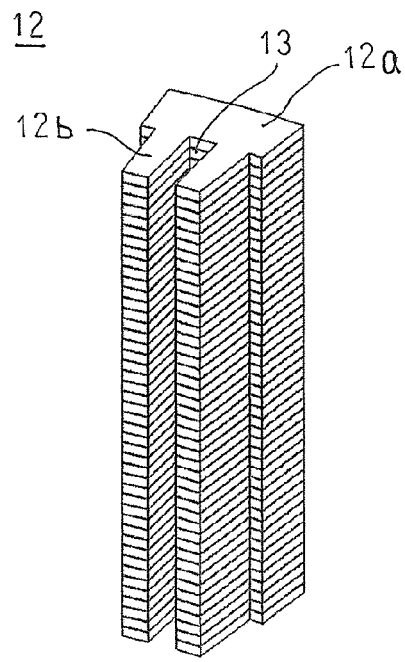
FIG. 4 is an oblique projection that shows a core block that constitutes the armature that is used in the rotary electric machine according to Embodiment 1 of the present invention.
Figure 5:
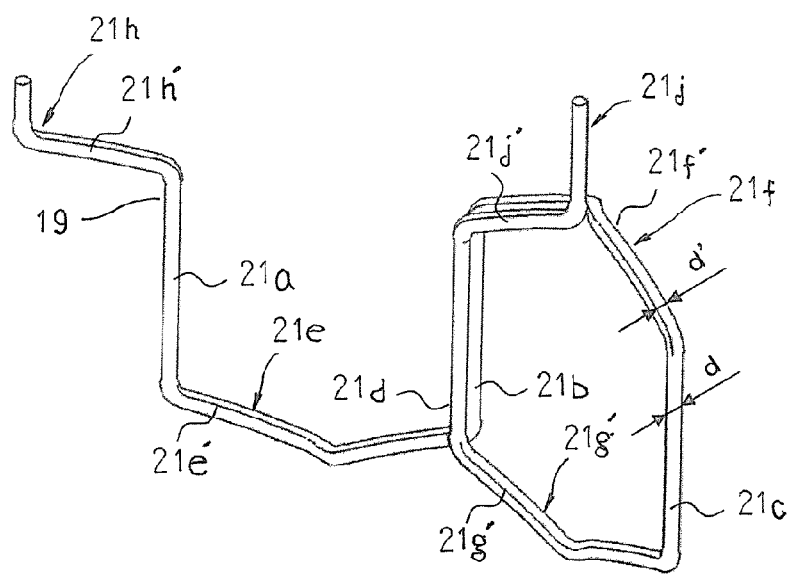
FIG. 5 is an oblique projection that shows a coil that constitutes an armature winding in the rotary electric machine according to Embodiment 1 of the present invention.
Figure 6:
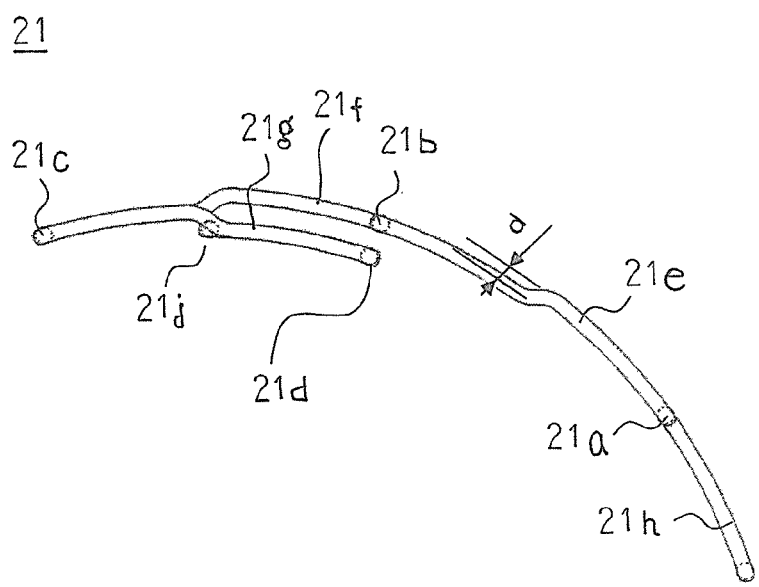
FIG. 6 is an end elevation that shows the coil that constitutes the armature winding in the rotary electric machine according to Embodiment 1 of the present invention.
Figure 7:
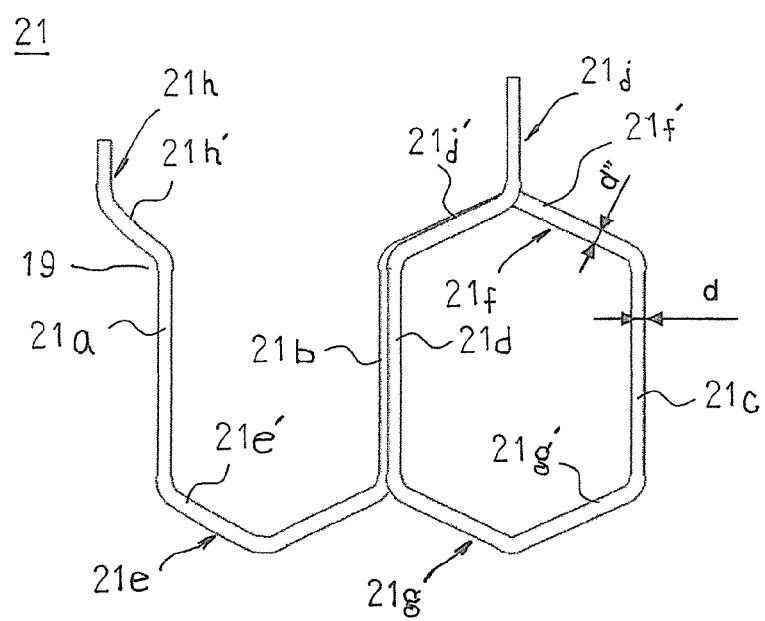
FIG. 7 is a front elevation that shows the coil that constitutes the armature winding in the rotary electric machine according to Embodiment 1 of the present invention.
Figure 8:
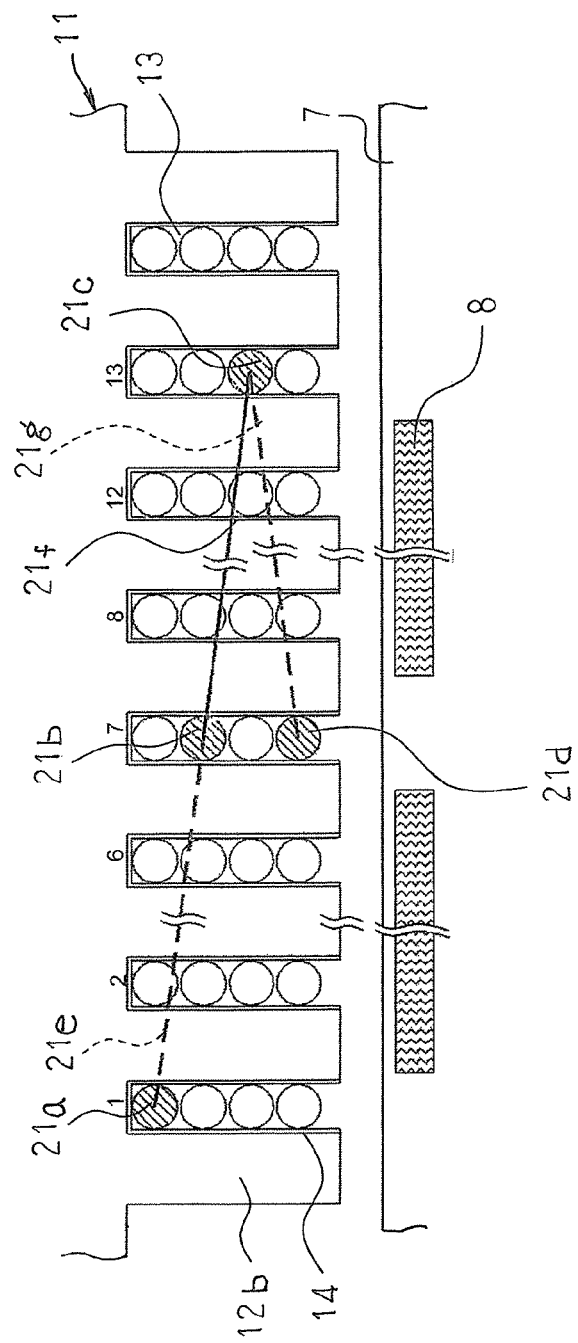
FIG. 8 is a cross-sectional schematic diagram that explains arrangement of the coils that constitute the armature winding that is used in the rotary electric machine according to Embodiment 1 of the present invention.
Figure 9:
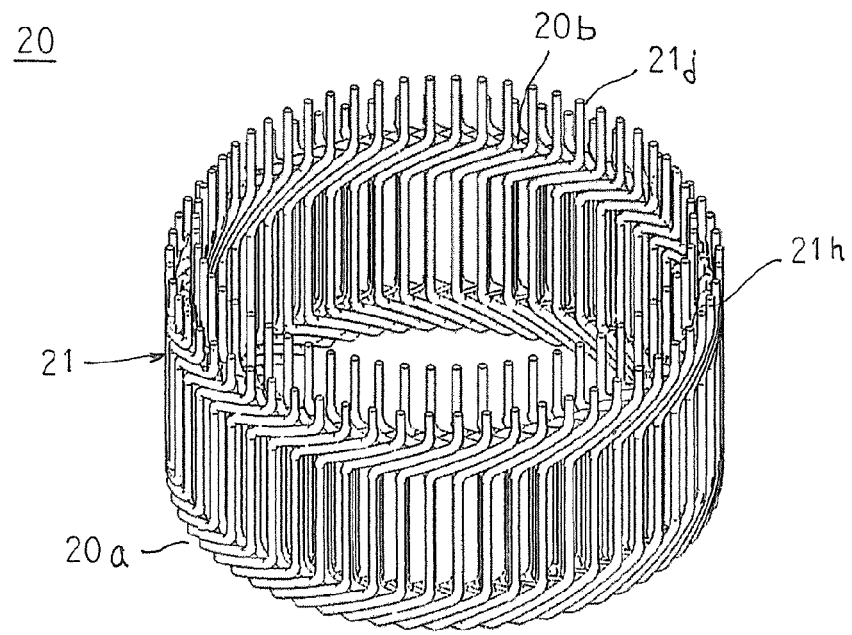
FIG. 9 is an oblique projection that shows an armature winding that is used in the rotary electric machine according to Embodiment 1 of the present invention.

FIG. 1 is a half section that shows a rotary electric machine according to Embodiment 1 of the present invention, FIG. 2 is an oblique projection that shows part of the rotary electric machine according to Embodiment 1 of the present invention, FIG. 3 is an oblique projection that shows an armature that is used in the rotary electric machine according to Embodiment 1 of the present invention, FIG. 4 is an oblique projection that shows a core block that constitutes the armature that is used in the rotary electric machine according to Embodiment 1 of the present invention, FIG. 5 is an oblique projection that shows a coil that constitutes an armature winding in the rotary electric machine according to Embodiment 1 of the present invention, FIG. 6 is an end elevation that shows the coil that constitutes the armature winding in the rotary electric machine according to Embodiment 1 of the present invention, FIG. 7 is a front elevation that shows the coil that constitutes the armature winding in the rotary electric machine according to Embodiment 1 of the present invention, FIG. 8 is a cross-sectional schematic diagram that explains arrangement of the coils that constitute the armature winding that is used in the rotary electric machine according to Embodiment 1 of the present invention, and FIG. 9 is an oblique projection that shows an armature winding that is used in the rotary electric machine according to Embodiment 1 of the present invention. Moreover, for simplicity, first through third coil end portions are represented using straight lines in FIG. 8.

In FIGS. 1 and 2, a rotary electric machine 100 includes: a housing 1 that has: a floored cylindrical frame 2; and an end plate 3 that closes an opening of the frame 2; an armature 10 that is fixed to a cylindrical portion of the frame 2 in an internally fitted state; and a rotor 5 that is fixed to a rotating shaft 6 that is rotatably supported in the floor portion of the frame 2 and the end plate 3 by means of bearings 4 so as to be rotatably disposed on an inner circumferential side of the armature 10.

The rotor 5 is a permanent-magnet rotor that includes: a rotor core 7 that is fixed to the rotating shaft 6, which is inserted through a central axial position thereof; and permanent magnets 8 that are embedded near an outer circumferential surface of the rotor core 7 so as to be arranged at a constant pitch circumferentially to constitute magnetic poles. Moreover, the rotor 5 is not limited to a permanent-magnet rotor, and a squirrel-cage rotor in which uninsulated rotor conductors are housed in slots of a rotor core such that two sides are shorted by a shorting ring, or a wound rotor in which insulated conductor wires are mounted into slots of a rotor core, etc., may be used.

Next, configuration of the armature 10 will be explained in detail with reference to FIGS. 3 through 9.

As shown in FIG. 3, the armature 10 includes: an armature core 11; an armature winding 20 that is mounted onto the armature core 11; and slot cells 44 that electrically isolate the armature core 11 and the armature winding 20. Here, to facilitate explanation, the number of poles in the rotor 5 is ten, the number of slots in the armature core 11 is sixty, and the armature winding 20 is a three-phase winding. In other words, the slots 13 are formed on the armature core 11 at a ratio of two slots per phase per pole.

As shown in FIG. 4, core blocks 12 are made by dividing the annular armature core 11 into thirty equal sections circumferentially, and include: a core back portion 12a that has a circular arc-shaped cross section, that is produced by laminating and integrating a large number of electromagnetic steel sheets; and two teeth 12b that are disposed so as to protrude radially inward from an inner circumferential wall surface of the core back portion 12a.

The armature core 11 is configured into an annular shape by arranging and integrating thirty core blocks 12 circumferentially by butting together circumferential side surfaces of the core back portions 12a such that the teeth 12b are oriented radially inward. The slots 13 that are each formed by the core back portions 12a and two circumferentially adjacent teeth 12b are arranged at a uniform angular pitch circumferentially so as to be open on an inner circumferential side. Moreover, the teeth 12b are formed so as to have a tapered shape in which a circumferential width becomes gradually narrower radially inward, and a cross section of the slots 13 is rectangular.

The slot cells 14 are formed into U shapes by bending and shaping rectangular sheets that are produced by sandwiching a polyimide film between meta-aramid fibers, for example, and are inserted into the slots 13 to isolate the armature core 11 and the armature winding 20 electrically.

The armature winding 20 is constituted by a plurality of coils 21. A coil 21 is produced by winding a conductor wire 19 that has a circular cross section that has a diameter d, that is made of jointless continuous copper wire or aluminum wire that is coated with an insulating enamel resin, for example, into a δ-shaped coil pattern. Moreover, the coil 21 may be produced by winding a conductor wire 19 that has a rectangular cross section into the δ-shaped coil pattern.

As shown in FIGS. 5 through 7, the coils 21 include: first, second, third, and fourth rectilinear portions 21a, 21b, 21c, and 21*d* that form three rows so as to be at an angular pitch of six slots apart; a first coil end portion 21*e* that links first longitudinal ends of the first and second rectilinear portions 21*a* and 21*b* to each other; a second coil end portion 21*f* that links second longitudinal ends of the second and third rectilinear portions 21*b* and 21*c* to each other; a third coil end portion 21*g* that links first longitudinal ends of the third and fourth rectilinear portions 21*c* and 21*d* to each other; a first coil terminal 21*h* that extends from a second longitudinal end of the first rectilinear portion 21*a*; and a second coil terminal 21*j* that extends from a second longitudinal end of the fourth rectilinear portion 21*d*. The first and second coil terminals 21*h* and 21*j* are connected to other coils 21, to electric power supplying portions, and to a neutral point. Moreover, an angular pitch of six slots is a pitch between slot centers of slots 13 on two sides of six circumferentially consecutive teeth 12*b*, and corresponds to a pitch of one magnetic pole.

Specifically, as shown in FIG. 8, the winding bodies 21 are produced into a δ-shaped coil pattern in which the conductor wire 19 is inserted into a first layer inside the slots 13 at Slot Number 1 from near a first axial end of the armature core 11, extends outward from the slots 13 at Slot Number 1 at a second axial end of the armature core 11, is inserted into a second layer inside the slots 13 at Slot Number 7, which is separated by an angular pitch of six slots in a first circumferential direction, extends outward from the slots 13 at Slot Number 7 at a second axial end of the armature core 11, is inserted into a third layer inside the slots 13 at Slot Number 13, which is separated by an angular pitch of six slots in the first circumferential direction, extends outward from the slots 13 at Slot Number 13 at the second axial end of the armature core 11, is inserted into a fourth layer inside the slots 13 at Slot Number 7, which is separated by an angular pitch of six slots in the second circumferential direction, and extends outward from the slots 13 at Slot Number 7 at the first axial end of the armature core 11. The coils 21 that are produced in this manner are distributed-winding coils.

Moreover, for simplicity, housed positions of the conductor wires 19 that are housed inside the slots 13 are designated a first layer, a second layer, a third layer, and a fourth layer from radially outside in FIG. 8. In FIG. 8, 1, 2, etc., through 13 are slot numbers that are allotted to the slots 13 sequentially in a circumferential direction.

Here, the first coil end portion 21*e* that extends outward at the second axial end of the armature core 11 from the first layer inside the slots 13 at Slot Number 1 maintains its radial position and extends at a constant inclination in the first circumferential direction and axially outward, is displaced by d radially inward at a crank portion of a central portion (the top portion), and subsequently maintains its radial position and extends at a reverse inclination in the first circumferential direction and axially inward to enter the second layer inside the slots 13 at Slot Number 7.

The second coil end portion 21*f* that extends outward at the first axial end of the armature core 11 from the second layer inside the slots 13 at Slot Number 7 maintains its radial position and extends at a constant inclination in the first circumferential direction and axially outward, is displaced by d radially inward at a crank portion of a central portion (the top portion), and subsequently maintains its radial position and extends at a reverse inclination in the first circumferential direction and axially inward to enter the third layer inside the slots 13 at Slot Number 13.

The third coil end portion 21*g* that extends outward at the second axial end of the armature core 11 from the third layer inside the slots 13 at Slot Number 13 maintains its radial position and extends at a constant inclination in the second circumferential direction and axially outward, is displaced by d radially inward at a crank portion of a central portion (the top portion), and subsequently maintains its radial position and extends at a reverse inclination in the second circumferential direction and axially inward to enter the fourth layer inside the slots 13 at Slot Number 7.

The first coil terminal 21*h* that extends from the first layer inside the slots 13 at Slot Number 1 at the first axial end of the armature core 11 maintains its radial position, extends in the second circumferential direction and axially outward at a constant inclination, and is subsequently bent to project radially outward.

The second coil terminal 21*j* that extends from the fourth layer inside the slots 13 at Slot Number 7 at the first axial end of the armature core 11 maintains its radial position, extends in the first circumferential direction and axially outward at a constant inclination, and is subsequently bent to project radially outward.

Thus, the first through third coil end portions 21*e*, 21*f*, and 21*g* have: pairs of inclined portions 21*e'*, 21*f'*, and 21*g'*; and crank portions that displace radially by the radial width d of the conductor wires 19. The first and second coil terminals 21*h* and 21*j* have: inclined portions 21*h'* and 21*j'* that extend outward from the slots 13; and joint portions that extend axially outward from end portions of the inclined portions 21*h'* and 21*j'*. The first through fourth rectilinear portions 21*a*, 21*b*, 21*c*, and 21*d* are formed so as to have circular cross sections of diameter d. The first through third coil end portions 21*e*, 21*f*, and 21*g* and the first and second coil terminals 21*h* and 21*j* are deformed by applying pressure to conductor wire that has a circular cross section from two radial sides using parallel flat plates, for example, so as to have flat cross sections that have a radial thickness d', where d'<d, and an axial thickness d", where d">d.

Sixty coils 21 that are produced in this manner are arranged into an annular shape circumferentially at a pitch of one slot to assemble the armature winding 20, as shown in FIG. 9. At a second axial end of this armature winding 20, a first coil end portion row 201 that is configured by arranging the first coil end portions 21*e* at a pitch of one slot circumferentially and a third coil end portion row 203 that is configured by arranging the third coil end portions 21*g* at a pitch of one slot circumferentially are lined up in two layers in a radial direction to constitute a first coil end 20*a*. At a first axial end of this armature winding 20, a second coil end portion row 202 that is configured by arranging the second coil end portions 21*f* at a pitch of one slot circumferentially constitutes a second coil end 20*b*. In addition, joint portions of the first coil terminals 21*h* that extend axially outward are arranged at a pitch of one slot circumferentially around a radially outer side of the second coil ends 20*b*. Furthermore, joint portions of the second coil terminals 21*j* that extend axially outward are arranged at a pitch of one slot circumferentially around a radially inner side of the second coil ends 20*b*.

Figure 10:
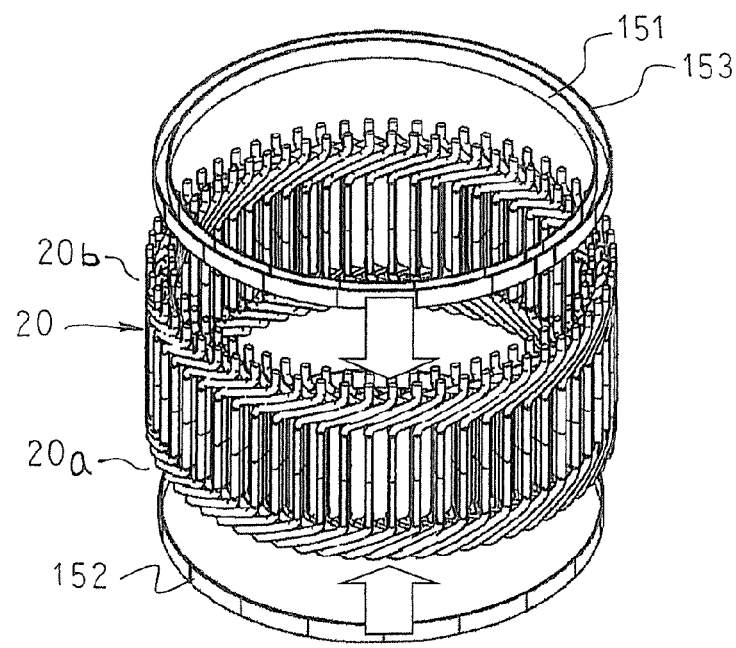
FIG. 10 is an oblique projection that explains a method for mounting insulating papers to the armature winding in the rotary electric machine according to Embodiment 1 of the present invention.
Figure 11:
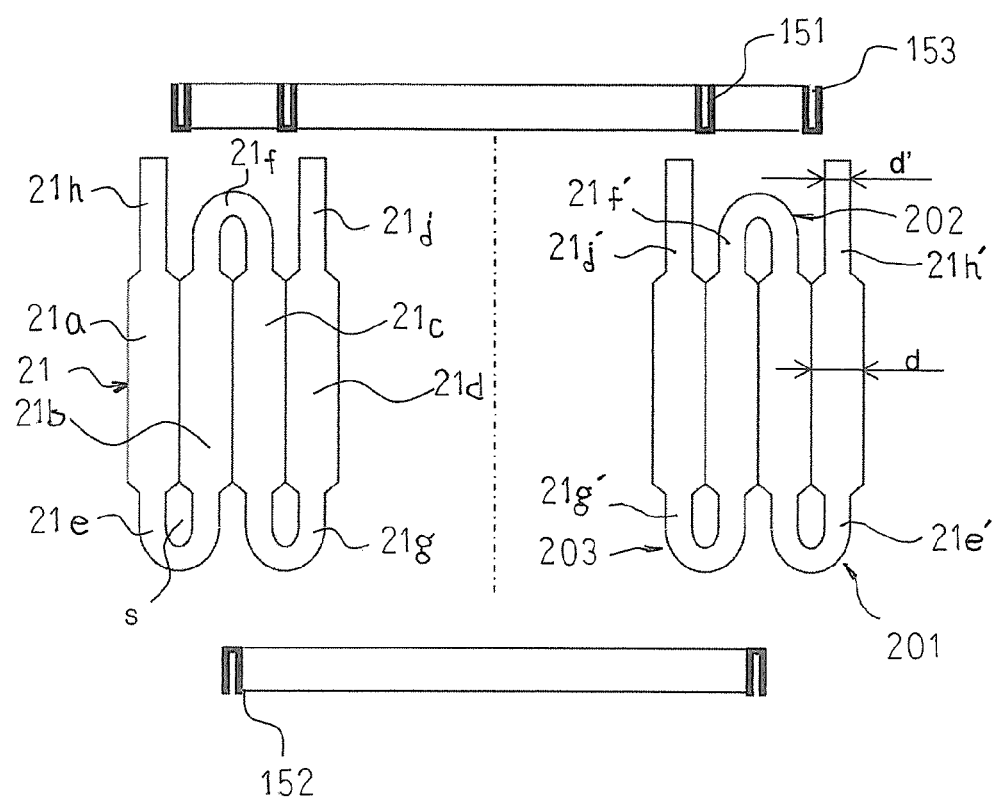
FIG. 11 is a schematic cross section that explains the method for mounting insulating papers to the armature winding in the rotary electric machine according to Embodiment 1 of the present invention.
Figure 12:
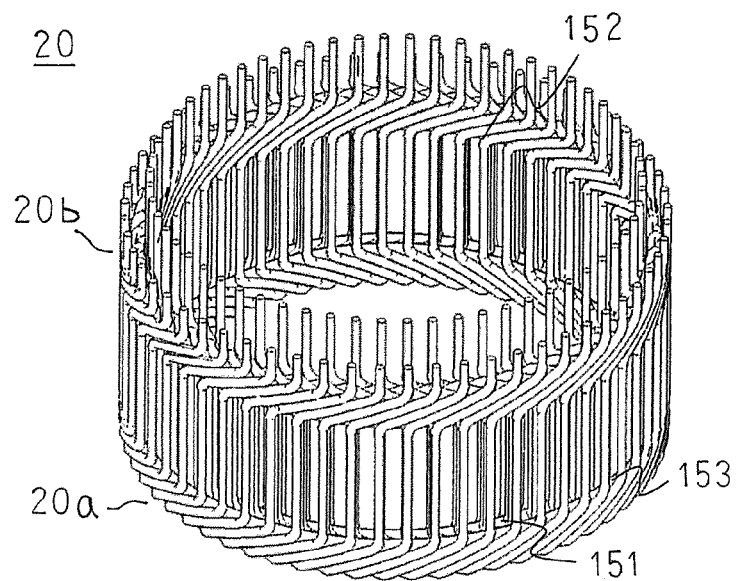
FIG. 12 is an oblique projection that shows a mounted state before heat hardening of the insulating papers of the armature winding in the rotary electric machine according to Embodiment 1 of the present invention.
Figure 13:
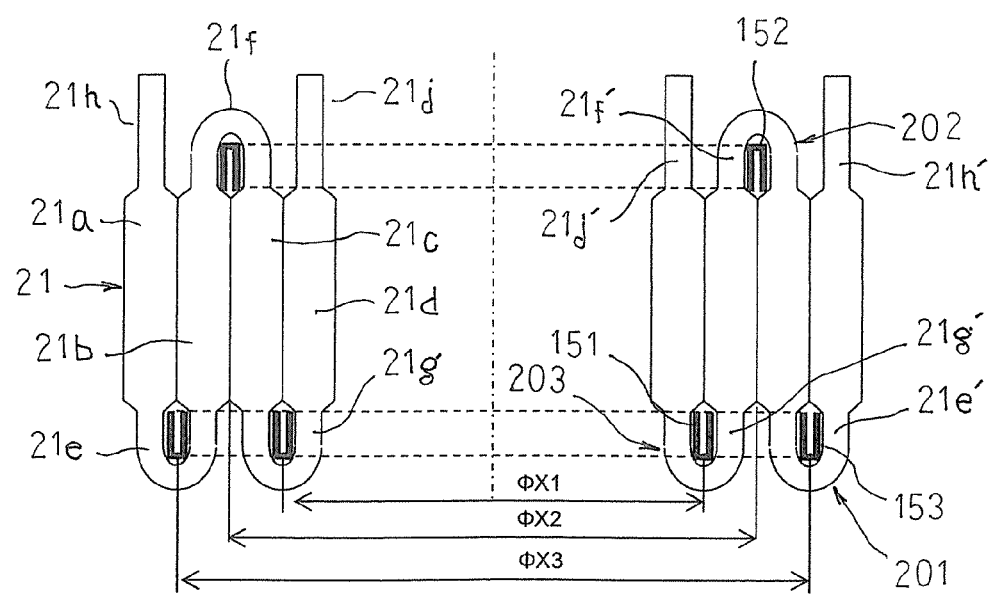
FIG. 13 is a schematic cross section that shows a mounted state of the insulating papers of the armature winding in the rotary electric machine according to Embodiment 1 of the present invention.
Figure 14:
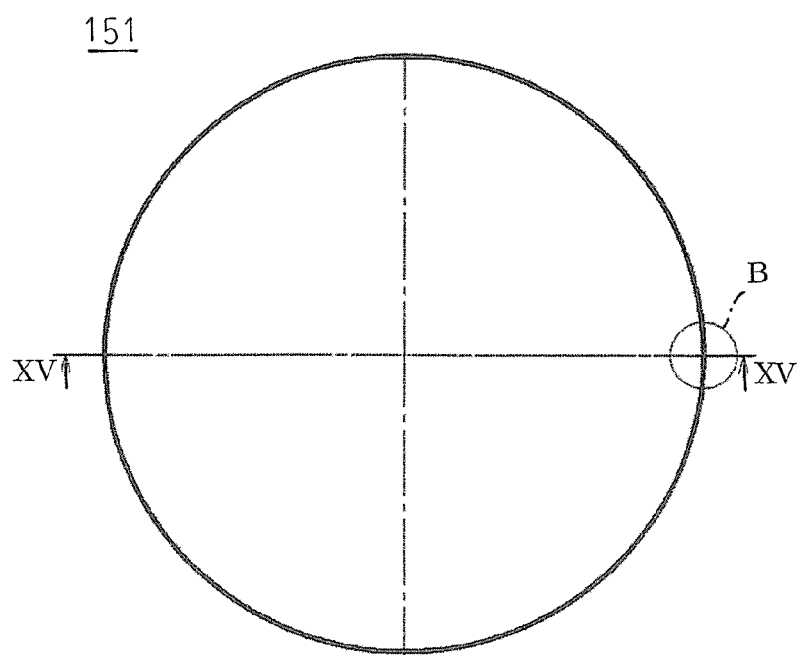
FIG. 14 is a plan that shows a first insulating paper that is mounted to the armature winding in the rotary electric machine according to Embodiment 1 of the present invention.
Figure 15:
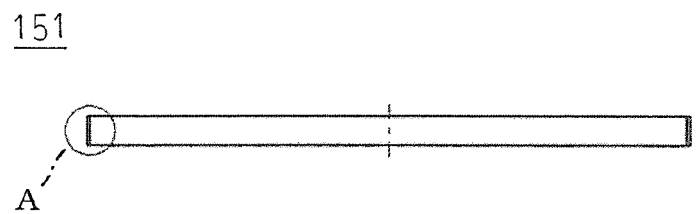
FIG. 15 is a cross section that is taken along Line XV-XV in FIG. 14 so as to be viewed in the direction of the arrows.
Figure 16:
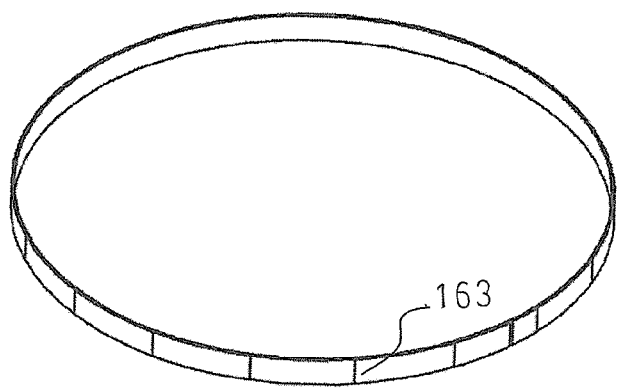
FIG. 16 is an oblique projection that shows a first insulating paper that is mounted to the armature winding in the rotary electric machine according to Embodiment 1 of the present invention.
Figure 17:
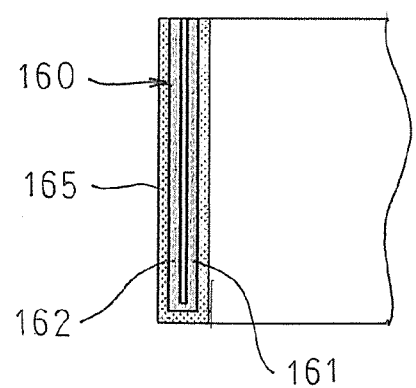
FIG. 17 is an enlargement of Portion A in FIG. 15.
Figure 18:
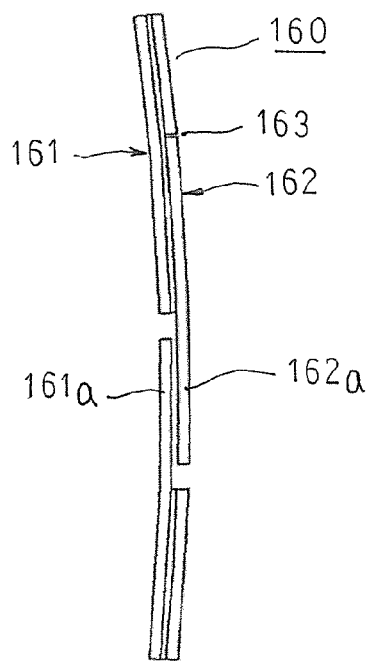
FIG. 18 is an enlargement of Portion B in FIG. 14.
Figure 19:
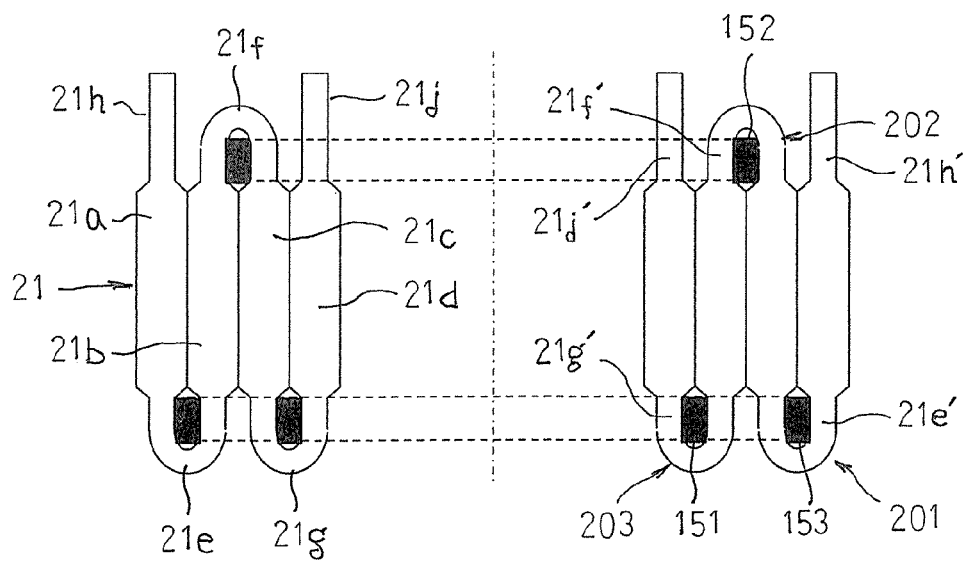
FIG. 19 is a schematic cross section that shows a mounted state after heat hardening of the insulating papers of the armature winding in the rotary electric machine according to Embodiment 1 of the present invention.
Figure 20:
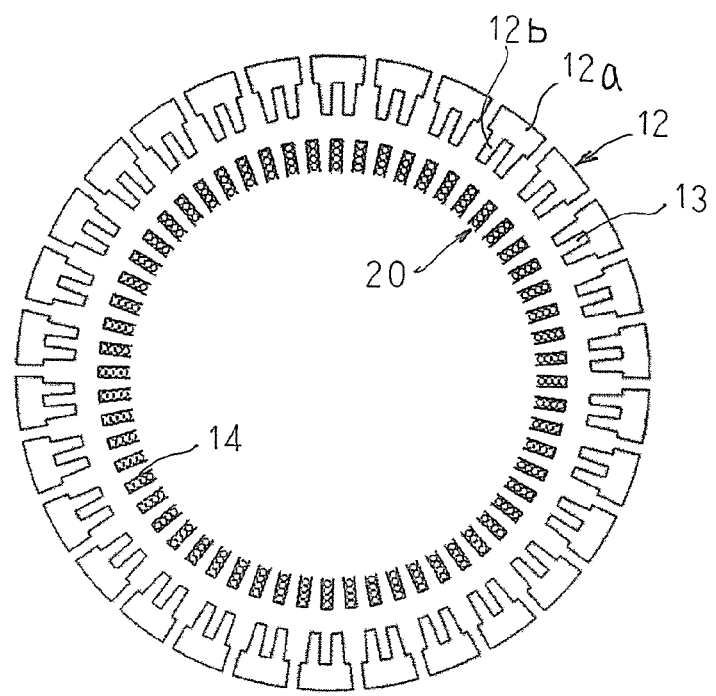
FIG. 20 is a diagram that explains a method for assembling the armature in the rotary electric machine according to Embodiment 1 of the present invention.
Figure 21:
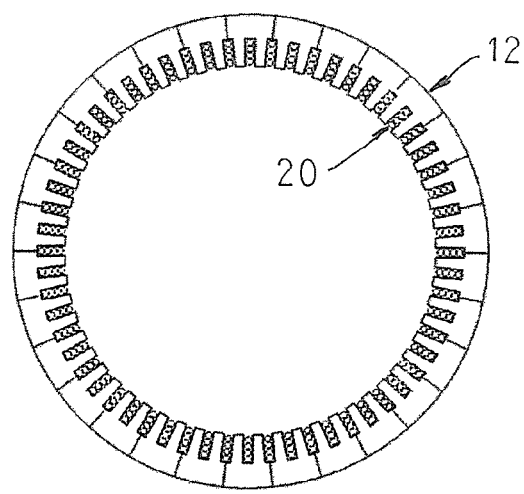
FIG. 21 is a diagram that explains the method for assembling the armature in the rotary electric machine according to Embodiment 1 of the present invention.

Next, a method for assembling the armature 10 will be explained with reference to FIGS. 10 through 21. FIG. 10 is an oblique projection that explains a method for mounting insulating papers to the armature winding in the rotary electric machine according to Embodiment 1 of the present invention, FIG. 11 is a schematic cross section that explains the method for mounting insulating papers to the armature winding in the rotary electric machine according to Embodiment 1 of the present invention, FIG. 12 is an oblique projection that shows a mounted state before heat hardening of the insulating papers of the armature winding in the rotary electric machine according to Embodiment 1 of the present invention, FIG. 13 is a schematic cross section that shows a mounted state of the insulating papers of the armature winding in the rotary electric machine according to Embodiment 1 of the present invention, FIG. 14 is a plan that shows a first insulating paper that is mounted to the armature winding in the rotary electric machine according to Embodiment 1 of the present invention, FIG. 15 is a cross section that is taken along Line XV-XV in FIG. 14 so as to be viewed in the direction of the arrows, FIG. 16 is an oblique projection that shows a first insulating paper that is mounted to the armature winding in the rotary electric machine according to Embodiment 1 of the present invention, FIG. 17 is an enlargement of Portion A in FIG. 15, FIG. 18 is an enlargement of Portion B in FIG. 14, FIG. 19 is a schematic cross section that shows a mounted state after heat hardening of the insulating papers of the armature winding in the rotary electric machine according to Embodiment 1 of the present invention, and FIGS. 20 and 21 are diagrams that explain a method for assembling the armature in the rotary electric machine according to Embodiment 1 of the present invention. Moreover, for simplicity, adhesive is omitted in FIG. 18. Moreover, for simplicity, only the first through fourth rectilinear portions of the armature winding are shown in FIGS. 20 and 21.

First, in the armature winding 20, the conductor wire 19 that has a circular cross section that has a diameter d is deformed such that the first through third coil end portions 21e, 21f, and 21g and the first and second coil terminals 21h and 21j have flat cross sections that have a radial thickness d', where d'<d, and an axial thickness d", where d">d.

Thus, as shown in FIG. 11, a gap S is formed inside the first coil end portion row 201 between the inclined portions 21e' that protrude outward from the first layer of the slots 13 and the inclined portions 21e' that protrude outward from the second layer of the slots 13. A gap S is also formed inside the third coil end portion row 203 between the inclined portions 21g' that protrude outward from the third layer of the slots 13 and the inclined portions 21g' that protrude outward from the fourth layer of the slots 13. In addition, a gap S is formed between the first coil end portion row 201 and the third coil end portion row 203, between the inclined portions 21e' that protrude outward from the second layer of the slots 13 and the inclined portions 21g' that protrude outward from the third layer of the slots 13.

Moreover, the inclined portions 21e' that protrude outward from the first layer of the slots 13 and the inclined portions 21e' that protrude outward from the second layer of the slots 13 correspond to radially adjacent conductor portions of portions of the conductor wires 19 that constitute the first coil ends 20a. The inclined portions 21g' that protrude outward from the third layer of the slots 13 and the inclined portions 21g' that protrude outward from the fourth layer of the slots 13 correspond to radially adjacent conductor portions of portions of the conductor wires 19 that constitute the first coil ends 20a. In addition, the inclined portions 21e' that protrude outward from the second layer of the slots 13 and the inclined portions 21g' that protrude outward from the third layer of the slots 13 correspond to radially adjacent conductor portions of portions of the conductor wires 19 that constitute the first coil ends 20a.

A gap S is formed inside the second coil end portion row 202 between the inclined portions 21f' that protrude outward from the second layer of the slots 13 and the inclined portions 21f' that protrude outward from the third layer of the slots 13. A gap S is also formed between a row of the first coil terminals 21h and the second coil end portion row 202, between the inclined portions 21h' that protrude outward from the first layer of the slots 13 and the inclined portions 21f' that protrude outward from the second layer of the slots 13. In addition, a gap S is formed between a row of the second coil terminals 21j and the second coil end portion row 202, between the inclined portions 21f' that protrude outward from the third layer of the slots 13 and the inclined portions 21j' that protrude outward from the fourth layer of the slots 13.

Moreover, the inclined portions 21f' that protrude outward from the second layer of the slots 13 and the inclined portions 21f' that protrude outward from the third layer of the slots 13 correspond to radially adjacent conductor portions of portions of the conductor wires 19 that constitute the second coil ends 20b. The inclined portions 21h' that protrude outward from the first layer of the slots 13 and the inclined portions 21f' that protrude outward from the second layer of the slots 13 correspond to radially adjacent conductor portions of portions of the conductor wires 19 that constitute the second coil ends 20b. In addition, the inclined portions 21f' that protrude outward from the third layer of the slots 13 and the inclined portions 21j' that protrude outward from the fourth layer of the slots 13 correspond to radially adjacent conductor portions of portions of the conductor wires 19 that constitute the second coil ends 20b.

Then, as shown in FIGS. 10 and 11, a second insulating paper 152 that functions as an interphase insulating material that is produced so as to have an annular shape is mounted to the armature winding 20 from a side near the first coil ends 20a, and first and third insulating papers 151 and 153 that function as interphase insulating materials that are produced so as to have an annular shape are mounted to the armature winding 20 from a side near the second coil ends 20b. Then, as shown in FIGS. 12 and 13, the first insulating paper 151 is moved so as to pass between the third rectilinear portions 21c and the fourth rectilinear portions 21d toward the first coil ends 20a, and is inserted into the gap S inside the first coil end portions 21e. The second insulating paper 152 is moved so as to pass between the second rectilinear portions 21b and the third rectilinear portions 21c toward the second coil ends 20b, and is inserted into the gap S inside the second coil end portions 21f. In addition, the third insulating paper 153 is moved so as to pass between the first rectilinear portions 21a and the second rectilinear portions 21b toward the first coil ends 20a, and is inserted into the gap S inside the third coil end portions 21g.

In this manner, the first, second, and third insulating papers 151, 152, and 153 are each inserted inside the first through third coil end portions 21e, 21f, and 21g, and are disposed in the first through third coil end portion rows 201, 202, and 203 so as to extend circumferentially. The average diameters of the first, second, and third insulating papers 151, 152, and 153 are øx1, øx2, and øx3, respectively, when disposed in the armature winding 20.

Moreover, although not shown, a first insulating paper 151 and a third insulating paper 153 may be inserted into a gap between the row of second coil terminals 21j and the second coil end portion row 202, and into a gap between the row of first coil terminals 21h and the second coil end portion row 202.

Here, as shown in FIGS. 14 through 17, the first insulating paper 151 is configured by curling into an annular shape an insulating sheet material 160 that is produced into a long strip shape, to one side of which a buffering material 165 is applied, and that is peak-folded at a central portion in a width direction such that the buffering material 165 faces outward. The insulating sheet material 160 that has been peak-folded at the central portion in the width direction is configured so as to have a two-layer construction in which an inner circumferential sheet material 161 and an outer circumferential sheet material 162 are laminated in a radial direction, the inner circumferential sheet material 161 protruding more than the outer circumferential sheet material 162 near a first end thereof, and the outer circumferential sheet material 162 protruding more than the inner circumferential sheet material 161 near a second end thereof. Thus, as shown in FIG. 18, when the insulating sheet material 160 is curled into the annular shape, the protruding portion 161a of the inner circumferential sheet material 161 and the protruding portion 162a of the outer circumferential sheet material 162 overlap with each other in the radial direction. In addition, as shown in FIGS. 16 and 18, slits 163 are arranged at a constant pitch circumferentially so as to each be formed so as to extend from a first end to a second end in a width direction of the outer circumferential sheet material 162.

The insulating sheet material 160 is produced using an insulating material such as a polyimide, an aramid, polyethylene terephthalate (PET), or polyphenylene sulfide (PPS), for example. A foaming adhesive is used as the buffering material 165 that is constituted by a thermosetting resin such as an epoxy resin that has electrically-insulating properties to which a foaming agent has been added, and that has properties including: being solidified without exhibiting adhesiveness at normal temperatures; exhibiting adhesiveness and forming air bubble groups internally when heated to a temperature that is greater than or equal to the setting temperature of the thermosetting resin; and hardening in a state of increased thickness.

Moreover, because the second and third insulating papers 152 and 153 are configured in a similar or identical manner to the first insulating paper 151, explanation thereof will be omitted.

Next, the armature winding 20 on which the first through third insulating papers 151, 152, and 153 are disposed is placed inside a furnace that is kept at a temperature that is greater than or equal to the setting temperature of the buffering material 165. The buffering material 165 thereby exhibits adhesiveness, and forms air bubble groups internally, increasing thickness. Thus, as shown in FIG. 19, the first through third insulating papers 151, 152, and 153 swell out in a radial direction, filling the gaps S inside the first, second, and third coil end portions 21e, 21f, and 21g. The first through third insulating papers 151, 152, and 153 are glued to the first, second, and third coil end portions 21e, 21f, and 21g by the buffering material 165. A cross-linking reaction occurs simultaneously among the molecules such that the buffering material 165 forms a two-dimensional network structure and is hardened in an expanded state. The first through third insulating papers 151, 152, and 153 are thereby disposed inside the first through third coil end portion rows 201, 202, and 203 in a fixed state.

Next, the slot cells 14 are mounted onto each of the columns of first through fourth rectilinear portions 21a, 21b, 21c, and 21d, which are arranged in single columns radially. In addition, the thirty core blocks 12 are arranged at a uniform angular pitch on an outer circumferential side of the armature winding 20 such that the teeth 12b are positioned on a radially outer side between the columns of first through fourth rectilinear portions 21a, 21b, 21c, and 21d, as shown in FIG. 20.

Next, the thirty core blocks 12 are simultaneously moved radially inward. The teeth 12b are inserted between the columns of first through fourth rectilinear portions 21a, 21b, 21c, and 21d by this radially inward movement of the core blocks 12. Then, the radially inward movement of the core blocks 12 is prevented by the circumferential side surfaces of the core back portions 12a of the adjacent core blocks 12 contacting each other.

As shown in FIG. 21, the core blocks 12 are thereby arranged into an annular shape by placing the circumferential side surfaces of the core back portions 12a in contact with each other to constitute the armature core 11. The armature winding 20 is mounted to the armature core 11 such that the respective columns of first through fourth rectilinear portions 21a, 21b, 21c, and 21d are housed inside the slots 13. Next, desired connection processes are applied to the first coil terminals 21h and the second coil terminal 21j to obtain the armature 10.

According to Embodiment 1, the first through third insulating papers 151, 152, and 153 are configured by forming on one surface of an insulating sheet material 160 a buffering material 165 that is constituted by a thermosetting resin to which a foaming agent has been added, and that has properties including: being solidified without exhibiting adhesiveness at normal temperatures; exhibiting adhesiveness and forming air bubble groups internally when heated to a temperature that is greater than or equal to the setting temperature of the thermosetting resin; and hardening in a state of increased thickness. The first through third insulating papers 151, 152, and 153 are disposed in the first through third coil end portion rows 201, 202, and 203, and are then heated to a temperature that is greater than or equal to the setting temperature of the thermosetting resin that constitutes the buffering material 164, expanding the buffering material 165, and fixing the first through third insulating papers 151, 152, and 153 to the first through third coil end portion rows 201, 202, and 203 by adhesion.

Consequently, a step of impregnating a varnish into the coil ends and hardening it after disposing the first through third insulating papers 151, 152, and 153 in the first through third coil end portion rows 201, 202, and 203 is no longer required, enabling manufacturing costs to be reduced. Because the first through third insulating papers 151, 152, and 153 are inserted between the coils that have different phases in the coil ends 20a and 20b of the armature winding 20, electrical insulation between the coils 21 that have different phases is ensured. In addition, because the first through third insulating papers 151, 152, and 153 are fixed to the first through third coil end portion rows 201, 202, and 203 adhesively, the occurrence of misalignment of or damage to the first through third insulating papers 151, 152, and 153 due to vibration during operation of the rotary electric machine 100 is suppressed, ensuring electrical insulation between the coils 21 that have different phases.

Because the buffering material 165 is solid at normal temperatures, and is in a state in which it cannot exhibit adhesiveness, handling of the first through third insulating papers 151, 152, and 153 is good, and the buffering material 165 will not adhere to tools, etc.

The occurrence of situations such as the insulating sheet material 160 rubbing against the conductor wires 19 that constitute the coils 21 and causing damage when the first through third insulating papers 151, 152, and 153 are disposed in the first through third coil end portion rows 201, 202, and 203 is suppressed by the buffering material 165. Electrical insulation between the coils 21 that have different phases in the coil ends 20a and 20b of the armature winding 20 is thereby improved.

Because the air bubble groups are present inside the hardened buffering material 165, the buffering material 165 has flexibility compared to epoxy varnishes or acrylic varnishes that are commonly used. Consequently, the buffering material 165 absorbs vibration that acts on the armature winding 20 during operation of the rotary electric machine 100, improving the vibration resistance of the armature winding 20.

Because the first through third insulating papers 151, 153, and 152 fill the first through third coil end portions 21e, 21f, and 21g, relative movement between the coils 21 is constrained, increasing the rigidity of the coil ends 20a and 20b. Because the first through third insulating papers 151, 153, and 152 do not move inside the first through third coil end portions 21e, 21f, and 21g, the occurrence of damage to the first through third insulating papers 151, 153, and 152 that results from abrasion is suppressed.

Even if the gaps S between the first through third coil end portions 21e, 21f, and 21g are widened, the first through third insulating papers 151, 153, and 152 fill the first through third coil end portions 21e, 21f, and 21g on heating. Consequently, the gaps S between the first through third coil end portions 21e, 21f, and 21g can be widened to improve workability when mounting the first through third insulating papers 151, 153, and 152 while still enabling fixing of the first through third insulating papers 151, 153, and 152 to be performed.

An insulating sheet material 160, on one surface of which the buffering material 165 is formed is peak-folded at a central portion in a width direction to produce each of the first through third insulating papers 151, 153, and 152 into a two-layer construction in which an inner circumferential sheet material 161 and an outer circumferential sheet material 162 are laminated in a radial direction. Thus, the first through third insulating papers 151, 153, and 152 can achieve electrically insulating properties that are similar or identical to when first through third insulating papers are configured by laminating two sheets of insulating sheet material on which a buffering material 165 is formed on one surface. Consequently, by using the first through third insulating papers 151, 153, and 152, the number of parts can be reduced, enabling productivity to be improved.

The first through third insulating papers 151, 153, and 152 are configured by peak-folding at a central portion in a width direction an insulating sheet material 160 in which a buffering material 165 is only formed on one surface. Thus, it is not necessary to form the buffering material 165 on two surfaces of the insulating sheet material 160, enabling manufacturing costs to be reduced.

A plurality of slits 163 are arranged circumferentially on the insulating sheet material 160 so as to each be formed so as to extend from a first end to a second end in a width direction of the outer circumferential sheet material 162. Thus, when curling the insulating sheet material 160 into an annular shape, forces that circumferentially compress the inner circumferential sheet material 161 that result from differences between inside and outside diameters between the inner circumferential sheet material 161 and the outer circumferential sheet material 162 do not arise. Thus, when curling the insulating sheet material 160 into an annular shape, creases are less likely to form on the inner circumferential sheet material 161, enabling the coil ends 20a and 20b to be reduced in size.

Moreover, in Embodiment 1 above, the buffering material of the first through third insulating papers is heated by placing the armature winding in which the first through third insulating papers have been placed in the coil ends inside a furnace, but the method for heating the buffering material of the first through third insulating papers is not limited thereto, and the buffering material of the first through third insulating papers may be heated in a step of manufacturing the armature using electric heating or induction heating, by passing an electric current through the armature winding, for example. Alternatively, the buffering material of the first through third insulating papers may be heated using heat generated in the armature winding during operation of the rotary electric machine. In that case, the step of heating the buffering material of the first through third insulating papers is no longer required in the manufacturing steps of the armature, enabling manufacturing costs to be reduced.

In Embodiment 1 above, the first through third insulating papers are produced by curling a long strip-shaped body into annular shapes, but the first through third insulating papers may be produced by curling the long strip-shaped body into circular arc shapes.

In Embodiment 1 above, a foaming adhesive is used as the buffering material that constitutes the first through third insulating papers, but it is not absolutely necessary for the buffering material to exhibit adhesiveness during heating, and may be constituted by a thermosetting resin that has insulating properties, to which a foaming agent has been added, that does not exhibit adhesiveness, provided that it has the properties of being in a solid state at normal temperatures, forming air bubble groups internally when heated to a temperature that is greater than or equal to its setting temperature, and hardening in a state of increased thickness. In that case, the thickness of the buffering material is increased by heating after the first through third insulating papers are disposed in the coil ends, pressing the buffering material against the coil end portions. Thus, the buffering material hardens in a state in which it is pressed against the coil end portions, and the first through third insulating papers are held on the coil end portions in a fixed state.

In Embodiment 1 above, a buffering material is used that is solid and does not exhibit adhesiveness at normal temperatures, but a buffering material may be used that is in a half-solid state and has weak adhesiveness at normal temperatures, that exhibits strong adhesiveness and also forms air bubble groups internally when heated to a temperature that is greater than or equal to its setting temperature, and that hardens in an expanded state.

In Embodiment 1 above, the coils are produced by winding a conductor wire into a δ-shaped coil pattern for one turn, but the coils may be coils that are produced by winding a conductor wire into a δ-shaped coil pattern for two or more turns. The coils are produced by winding the conductor wire for one turn into a δ-shaped coil pattern, but the coils may be "hexagonal" coils that are produced by winding the conductor wire helically, or may be U-shaped coils in which two rectilinear portions are linked by coil end portions.

In Embodiment 1 above, coil end portions link together end portions of rectilinear portions that are inserted into slots that are separated by an angular pitch of six slots, but spacing between the slots into which the two rectilinear portions that are linked by the coil end portions are inserted is not limited to an angular pitch of six slots, and need only be greater than or equal to an angular pitch of two slots.

In Embodiment 1 above, the first coil end portion row and the third coil end portion row are arranged in two layers in a radial direction, but the first coil end portion row and the third coil end portion row may be arranged in two layers axially. In other words, the first coil end portion row may be arranged so as to be positioned outside the third coil end portion row. For example, if four rectilinear portions are inserted inside the slots so as to line up in a single column in a radial direction, then a configuration in which the first coil end portion row and the third coil end portion row are arranged in two layers axially can be achieved by first coil end portions linking together end portions of rectilinear portions that are positioned in the first layer and the fourth layer, and third coil end portions linking together end portions of rectilinear portions that are positioned in the second layer and the third layer. Thus, interphase insulating papers are inserted between inclined portions of the first coil end portions that protrude outward from the first layer of the slots and inclined portions of the third coil end portions that protrude outward from the second layer of the slots, between inclined portions of the third coil end portion row that protrude outward from the second layer and the third layer of the slots, and between inclined portions of the third coil end portions that protrude outward from the third layer of the slots and inclined portions of the first coil end portions that protrude outward from the fourth layer of the slots, respectively.

What is claimed is:

1. An armature for a rotary electric machine comprising:
   an annular armature core in which slots are arranged circumferentially;
   an armature winding that is mounted to said armature core; and
   an interphase insulating material that is disposed in a coil end of said armature winding,
   wherein:
   said armature winding is configured by mounting into said armature core a plurality of distributed-winding coils that are each produced by bending and shaping a conductor wire that is coated with insulation; and
   said interphase insulating material includes:
   a strip-shaped insulating sheet material that is inserted between radially adjacent conductor portions in portions of said conductor wires that constitute said coil end so as to have a thickness direction in a radial direction, and that is disposed so as to extend circumferentially; and
   an insulating buffering material that is formed on one surface of said insulating sheet material, and that fills between radially adjacent conductor portions so as to have internal air bubble groups, wherein:
   said buffering material is formed only on one surface of said insulating sheet material; and
   said insulating sheet material is configured into a two-layer construction in which an inner circumferential sheet material and an outer circumferential sheet material are laminated in said radial direction by peak-folding at a central portion in a width direction such that said buffering material faces outward.

2. The armature for a rotary electric machine according to claim 1, wherein a plurality of slits are arranged circumferentially on said outer circumferential sheet material so as to each be formed so as to extend from a first end to a second end in a width direction of said outer circumferential sheet material.

3. An armature for a rotary electric machine comprising:
   an annular armature core in which slots are arranged circumferentially;
   an armature winding that is mounted to said armature core; and
   an interphase insulating material that is disposed in a coil end of said armature winding,
   wherein:
   said armature winding is configured by mounting into said armature core a plurality of distributed-winding coils that are each produced by bending and shaping a conductor wire that is coated with insulation; and
   said interphase insulating material includes:
   a strip-shaped insulating sheet material that is inserted between radially adjacent conductor portions in portions of said conductor wires that constitute said coil end so as to have a thickness direction in a radial direction, and that is disposed so as to extend circumferentially; and
   an insulating buffering material that is formed on one surface of said insulating sheet material, and that fills between radially adjacent conductor portions so as to have internal air bubble groups,
   wherein said buffering material is a foaming adhesive that is made of a thermosetting resin to which a foaming agent has been added, and that is constituted so as to exhibit adhesiveness and to form air bubble groups internally when heated to a temperature that is greater than or equal to a setting temperature of said thermosetting resin, and so as to harden in an expanded state,
   wherein:
   said buffering material is formed only on one surface of said insulating sheet material; and
   said insulating sheet material is configured into a two-layer construction in which an inner circumferential sheet material and an outer circumferential sheet material are laminated in said radial direction by peak-folding at a central portion in a width direction such that said buffering material faces outward.

4. The armature for a rotary electric machine according to claim 3, wherein a plurality of slits are arranged circumferentially on said outer circumferential sheet material so as to each be formed so as to extend from a first end to a second end in a width direction of said outer circumferential sheet material.

* * * * *